United States Patent
Sundaresan et al.

(10) Patent No.: US 10,444,336 B2
(45) Date of Patent: Oct. 15, 2019

(54) DETERMINING LOCATION/ORIENTATION OF AN AUDIO DEVICE

(71) Applicant: BOSE CORPORATION, Framingham, MA (US)

(72) Inventors: Rameshwar Sundaresan, Shrewsbury, MA (US); Brian S. Lingard, Shrewsbury, MA (US); Peter J. Gjeltema, Stow, MA (US)

(73) Assignee: BOSE CORPORATION, Framingham, MA (US)

( * ) Notice: Subject to any disclaimer, the term of this patent is extended or adjusted under 35 U.S.C. 154(b) by 336 days.

(21) Appl. No.: 15/642,946

(22) Filed: Jul. 6, 2017

(65) Prior Publication Data

US 2019/0011545 A1  Jan. 10, 2019

(51) Int. Cl.
  *G01S 11/14* (2006.01)
  *G01S 5/18* (2006.01)
  *H04W 64/00* (2009.01)
  *H04B 11/00* (2006.01)
  *G01S 5/30* (2006.01)

(52) U.S. Cl.
  CPC ............... *G01S 11/14* (2013.01); *G01S 5/18* (2013.01); *H04W 64/00* (2013.01); *G01S 5/30* (2013.01); *H04B 11/00* (2013.01)

(58) Field of Classification Search
  CPC .. G01S 11/14; G01S 5/18; G01S 5/30; H04W 64/00; H04B 11/00
  See application file for complete search history.

(56) References Cited

U.S. PATENT DOCUMENTS

| 2,198,113 A | * | 4/1940 | Holmes | G01S 1/02 342/125 |
| 4,401,987 A | * | 8/1983 | Cyr | G01S 7/536 342/46 |

(Continued)

FOREIGN PATENT DOCUMENTS

| KR | 20150075327 A | * | 7/2015 |
| KR | 101585741 B1 | * | 1/2016 |

(Continued)

OTHER PUBLICATIONS

International Search Report and Written Opinion for Interational Application No. PCT/US2018/039302 dated Aug. 31, 2018.

(Continued)

*Primary Examiner* — Daniel Pihulic
(74) *Attorney, Agent, or Firm* — Patterson + Sheridan, LLP

(57) ABSTRACT

Aspects of the present disclosure provide a first apparatus configured to transmit a first signal having a first frequency to a second apparatus, receive, from the second apparatus, a second signal having a second frequency responsive to the first signal, determine a latency associated with the transmitted first signal and received second signal and, determine a distance between the first apparatus and the second apparatus based, at least in part, on the determined latencies. According to an example, the first apparatus further determines a direction of the second apparatus relative to the first apparatus. According to an example, at least one of the first signal or second signal comprises an ultrasonic or high-frequency signal.

20 Claims, 4 Drawing Sheets

(56) References Cited

U.S. PATENT DOCUMENTS

| | | | |
|---|---|---|---|
| 5,659,520 A * | 8/1997 | Watson | G01S 3/8083 |
| | | | 342/146 |
| 8,401,569 B1 | 3/2013 | Bell et al. | |
| 8,532,644 B2 | 9/2013 | Bell et al. | |
| 8,862,156 B2 | 10/2014 | Bell et al. | |
| 9,025,416 B2 * | 5/2015 | Millar | G01S 13/46 |
| | | | 367/127 |
| 9,689,958 B1 | 6/2017 | Wild et al. | |
| 2011/0210847 A1 | 9/2011 | Howard et al. | |
| 2013/0163382 A1 * | 6/2013 | Millar | G01S 13/46 |
| | | | 367/127 |
| 2013/0260785 A1 | 10/2013 | Shakespeare et al. | |
| 2013/0315038 A1 | 11/2013 | Ferren et al. | |
| 2014/0105054 A1 * | 4/2014 | Sægrov | H01Q 3/2605 |
| | | | 370/252 |
| 2015/0113094 A1 | 4/2015 | Williams et al. | |
| 2015/0119067 A1 | 4/2015 | Lavery | |
| 2015/0358768 A1 | 12/2015 | Luna et al. | |
| 2016/0057522 A1 | 2/2016 | Choisel et al. | |
| 2016/0139241 A1 | 5/2016 | Holz et al. | |
| 2019/0011545 A1 * | 1/2019 | Sundaresan | G01S 11/14 |

FOREIGN PATENT DOCUMENTS

| | | | |
|---|---|---|---|
| WO | 201661353 A1 | 4/2016 | |
| WO | WO-2019010030 A1 * | 1/2019 | G01S 11/14 |

OTHER PUBLICATIONS

International Search Report and Written Opinion for International Application No. PCT/US2018/039313 dated Sep. 3, 2018, 17 pp.

* cited by examiner

DETERMINING LOCATION/ORIENTATION OF AN AUDIO DEVICE

BACKGROUND

Aspects of the present disclosure generally relate to determining a location and/or orientation of an audio device.

With advancements in technology, the number of wirelessly-connectable devices is increasing. To achieve greater functionality, certain connectable devices are configured to work together. As an example, certain home theater or sound systems use multiple wirelessly connected speakers. The speakers may be configured based on their relative location to each other. User-friendly methods for locating each speaker in an environment may ease the set-up process for a user.

SUMMARY

All examples and features motioned herein can be combined in any technically possible manner.

Certain aspects of the present disclosure provide a first apparatus, comprising a transmitter, a first receiver, and a processor. The transmitter is configured to transmit a first signal having a first frequency to a second apparatus, the first receiver is configured to receive, from the second apparatus, a second signal having a second frequency responsive to the first signal. The processor is configured to determine a latency associated with the transmitted first signal and received second signal and is configured to determine a distance between the first apparatus and the second apparatus based, at least in part, on the determined latencies.

According to an aspect, determining the distance comprises determining a total travel time of the first signal and the second signal based, at least in part, on the determined latencies at each of the first and second devices.

According to an aspect, the first apparatus further comprises a timer. The processor is further configured to start the timer after transmitting the first signal, stop the timer after receiving the second signal, and determine the total travel time based, at least in part, on an elapsed time between starting and stopping of the timer.

According to an aspect, the processor is configured to determine a time of flight by subtracting the determined latencies from the total travel time and dividing the difference by two. According to an aspect, the distance is determined based, at least in part, on the speed of sound and the determined time of flight.

According to an aspect, the latency associated with the transmitted first signal comprises a preconfigured delay time at the second apparatus.

According to an aspect, receiving the second signal comprises receiving a sound wave with a frequency varying in time. According to an aspect, the latency associated with the received second signal at the first apparatus is determined based, at least in part, on a rate of change of frequency of the second signal.

According to an aspect, the first apparatus comprises a second receiver and a third receiver. The second receiver is configured to receive the second signal and the third receiver configured to receive the second signal. The processor is configured to determine a direction of the second apparatus relative to the first apparatus based, at least in part, on a difference in arrival times of the second signal at each of the first, second, and third receivers. According to an aspect, determining the direction is further based on a distance between the first and second receivers and a distance between the second and third receivers.

According to an aspect, at least one of the first signal or the second signal comprises an ultrasonic signal. According to an aspect, at least one of the first frequency or the second frequency comprises a frequency greater than or equal to 8 kHz.

Certain aspects of the present disclosure provide a second apparatus, comprising a processor and memory comprising instructions which, when executed by the processor, cause the second apparatus to receive, from a first apparatus, a first signal having a first frequency, determine a latency associated with receiving the first signal, calculate when to transmit a second signal having a second frequency based on the determined latency, and transmit the second signal based on the calculation.

According to an aspect, the first signal comprises a signal with a frequency varying in time.

According to an aspect, determining the latency comprises determining a delay in time of an arrival of the first signal at the second apparatus based, at least in part, on a rate of change of frequency of the first signal.

According to an aspect, calculating when to transmit the second signal comprises subtracting the determined latency from a preconfigured delay time.

According to an aspect, at least one of the first frequency or the second frequency comprises a frequency greater than or equal to 8 kHz.

Certain aspects of the present disclosure provide a method for communication by a first apparatus, comprising transmitting a first signal to a second apparatus, receiving a second signal from the second apparatus, responsive to the first signal, at each of a first, second, and third microphones at the first apparatus, and determining a distance between the first and second apparatus based, at least in part, on a latency associated with the first, transmitted signal and a latency associated with the second, received signal.

According to an aspect, the method further comprises determining a time of flight for the second signal to reach each of the first, second, and third microphones and determining a direction of the second apparatus relative to the first apparatus based, at least in part, on: a distance between the first and second microphone, a distance between the second and third microphone, and the determined time of flights.

According to an aspect, the latency associated with the second, received signal at the first apparatus is determined based, at least in part, on a rate of change of frequency of the second signal.

DETAILED DESCRIPTION

Aspects of the present disclosure relate to determining a location of a device using high-frequency or ultrasonic signaling. For example, the signaling may involve frequencies greater than or equal to approximately 8 kHz. Advantageously, aspects described herein are used to locate devices wirelessly connected with one or more other devices by using signaling receivable by the device to be located. In some examples, the signaling may be generally outside the audible range of human hearing. In other examples, audible tones may be used. For illustrative purposes, the devices may be one or more audio devices, such as a portable speaker, a speaker that is part of a home theater system and headphones. Unless specified otherwise, the term headphone, as used in this document, includes various types of personal acoustic devices such as over-the-ear and in-ear headsets, earphones, earbuds, hearing aids, shoulder or body-worn acoustic devices, or other wireless-enabled acoustic devices.

According to an aspect, a first apparatus (such as a speaker) may be configured to both determine a location (for example, based on a distance between the first and second apparatus) and an orientation of a second apparatus (such as another speaker). The first apparatus determines the orientation relative to the second apparatus using one or more receivers/microphones at the first apparatus.

Figure 1:
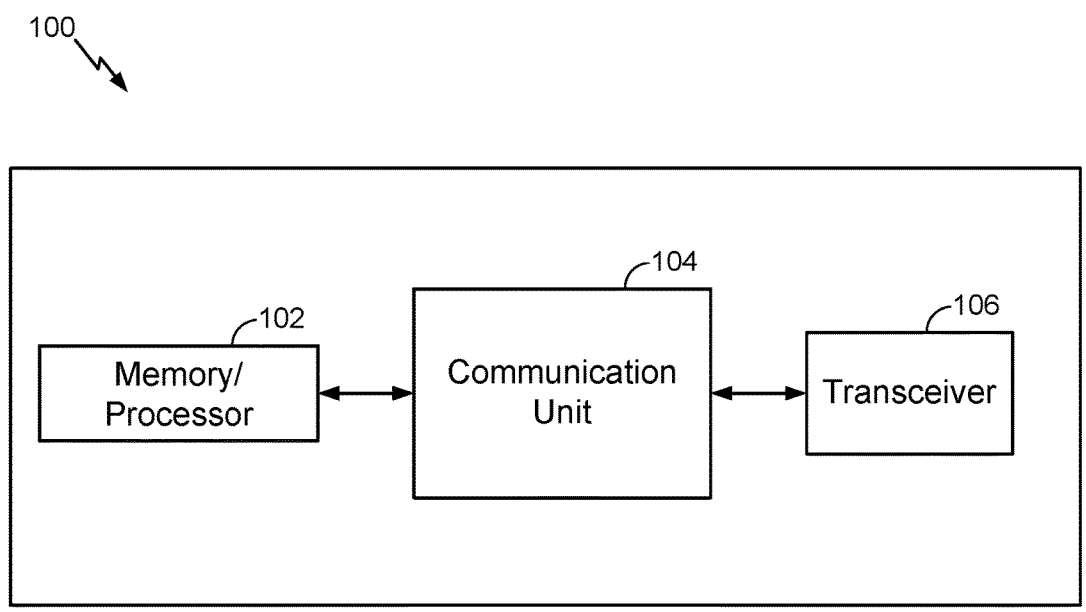
FIG. 1 is a block diagram of a wireless device.

FIG. 1 illustrates example components of an apparatus 100. The apparatus may be, for example, headphones or a speaker. The apparatus 100 includes a memory and processor 102, communication unit 104, and transceiver 106. The memory may include Read Only Memory (ROM), a Random Access Memory (RAM), and/or a flash ROM. The memory stores program code for controlling the memory and processor 102. The memory and processor 102 control the operations of the apparatus 100. Any or all of the components in FIG. 1 may be combined into multi-function components.

The processor 102 controls the general operation of the apparatus 100. For example, the processor 102 performs process and control for audio and data communication. In addition to the general operation, the processor 102 initiates determining a location and/or orientation of a second apparatus relative to the first apparatus, as further described below. According to an example, the processor 102 includes at least one microcontroller used to determine a latency associated with a received signal.

The communication unit 104 facilitates a wireless connection with one or more other wireless devices. According to an example, the communication unit 104 includes a Bluetooth module to facilitate Bluetooth communication between the apparatuses 100 and not-illustrated other apparatuses. While Bluetooth is used as an example protocol, other communication protocols may also be used. Some examples include Bluetooth Low Energy (BLE), Near Field Communications (NFC), IEEE 802.11, or other local area network (LAN) or personal area network (PAN) protocols.

The transceiver 106 transmits and receives information via one or more antennae to exchange information with one or more other wireless devices. According to aspects, the transceiver 106 includes one or more microphones for, for example, receiving sound emitted by one or more other wireless devices. To determine an orientation of a second apparatus relative to the first apparatus 100, the transceiver includes multiple microphones. According to an example, the first apparatus has three microphones, as will be described in more detail with reference to FIG. 4. The transceiver 106 is not necessarily a distinct component. The transceiver may be implemented entirely in software executed by the communication unit 104.

Figure 2:
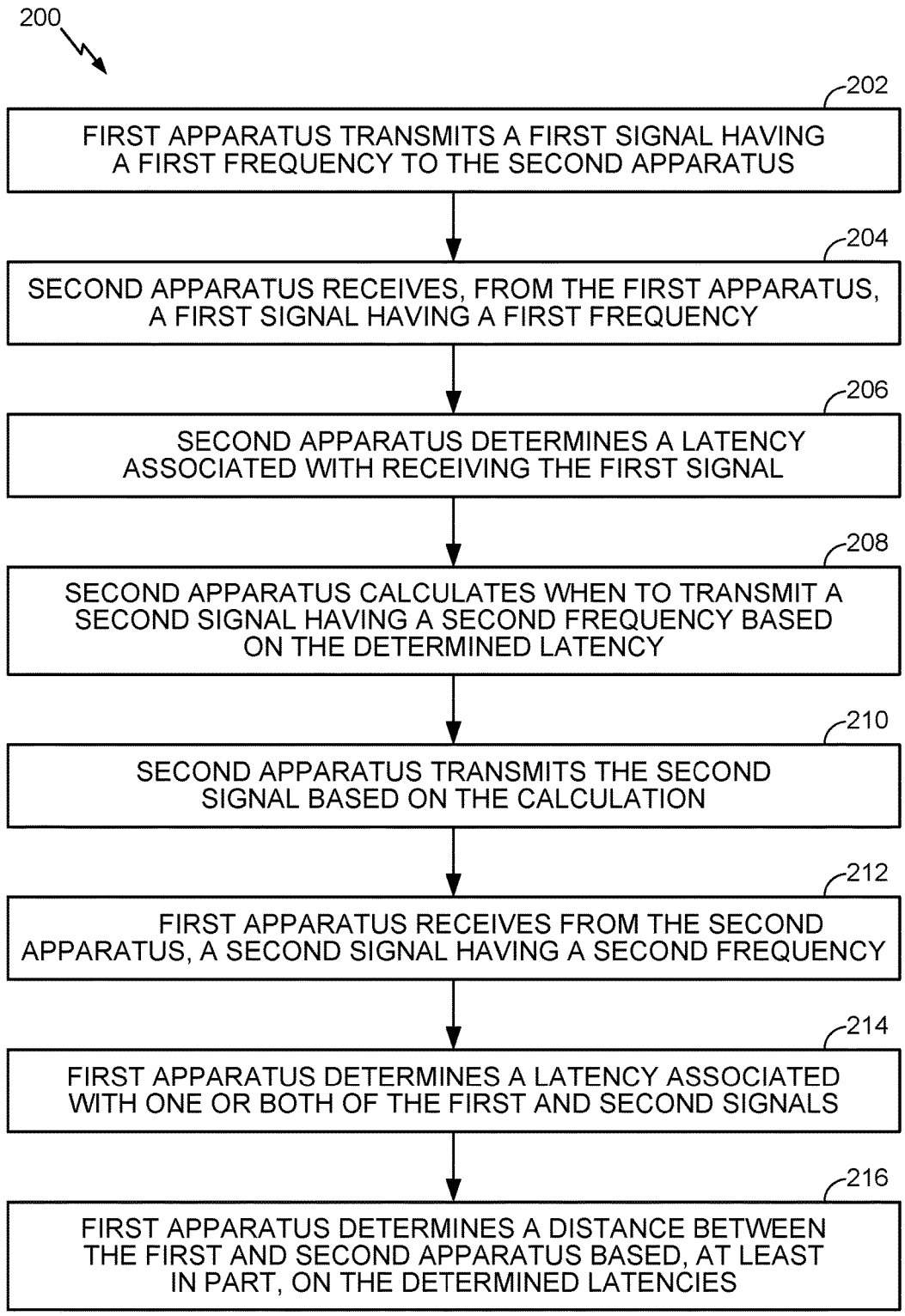
FIG. 2 is a flow diagram illustrating example operations for determining a distance between the first apparatus and a second apparatus.

FIG. 2 illustrates example operations 200, performed, for determining a location of a second apparatus, in accordance with aspects of the present disclosure. The first and second apparatus may each include one or more components as illustrated in FIG. 1 and described with reference to FIG. 1. In one example, the first apparatus and the second apparatus may each be wireless speakers, connected to each other over a wireless network, and each forming a portion of a home theater system in a home. According to an example, a wireless connection is not required for the methods described herein. For example, the first apparatus and the second apparatus may be incidentally connected via a network, but the wireless connection is not necessary to determine a location and/or orientation of the second apparatus. According to an aspect, the first apparatus and second apparatus are connected via a self-configuring or ad hoc network, which do not rely on a pre-existing infrastructure.

To facilitate setup of such a home theater system in a way that is automatic and seamless to a user, the wireless speakers may be configured to determine a relative location and orientation of other speakers in the network so that the home theater system can be automatically paired and/or assigned roles within the home theater system (e.g., left stereo, right stereo, etc.). For example, one or more of the speakers in the home theater system may be used to detect the position of the left, right and rear stereo components in a room, and a microcontroller or other processor within than speaker may be used to initiate an automatic pairing and/or configuration process to complete an automatic setup of the system. Determining a location may include, for example, determining a distance between the first and the second apparatus or determining both a distance between the first and second apparatus and determining an orientation of the second apparatus relative to the first apparatus.

At 202, the first apparatus transmits a first signal having a first frequency or frequency range to the second apparatus. As described above, the first apparatus and the second apparatus may be incidentally connected via a network; however, the wireless connection is not necessary to determine a location and/or orientation of the second apparatus. Accordingly, the signaling used to determine the location and/or orientation of the second apparatus may be transmitted wirelessly absent the use of a wireless protocol.

At 204, the second apparatus receives from the first apparatus a first signal having a first frequency or frequency range (e.g., the first signal transmitted by the first apparatus in step 202). At 206, the second apparatus determines a latency associated with receiving the first signal. At 206, and as described further below, the second apparatus calculates when to transmit a second signal to the first apparatus based on the determined latency.

The second signal has a second frequency, different than the first frequency. As described in more detail below, one or both of the first or second signals comprise a signal having a frequency varying in time. The second apparatus determines a latency associated with receiving the first signal based, at least in part, on a known rate of change of frequency of the received, first signal. According to aspects, the second apparatus subtracts the determined latency from a preconfigured time delay, in an effort to synchronize the first and second apparatus.

At 210, the second apparatus transmits the second signal based, at least in part, on the calculation. As described above, the transmission may be wireless absent the use of a wireless protocol. At 212, the first apparatus receives from the second apparatus a second signal having a second frequency or frequency range. The first and second frequency (or frequency ranges) may be frequencies that are generally inaudible to humans, e.g., higher frequencies above approximately 8 kHz. In some examples, the first frequency may be between approximately 4 kHz to 8 kHz and the second frequency may be between approximately 10 kHz to 14 kHz. However, other frequencies, including those in the audible range, may be used. Using different frequencies or frequency ranges for the first and second signals prevents reflections of the first and second signals that are received by the first or second apparatus from being misinterpreted as the signal of interest. For example, if the second apparatus were to respond to the first apparatus with a second signal of the same frequency or frequency range as the first signal, it may not be clear whether the first apparatus is receiving the second signal or is receiving merely reflections of the first signal. Thus, each apparatus is configured to emit a unique frequency or frequency range for which the other apparatus will listen, so that any signals received are known to be directly from the apparatus of interest.

At 214, the first apparatus determines a latency associated with one or both of the first and second signals. According to an example, the latency associated with the first signal comprises a preconfigured delay time at the second apparatus, wherein the preconfigured delay time is known by the first apparatus. In one example, the first apparatus and the second apparatus are preconfigured with the delay time. As described in more detail below, the first apparatus can use this preconfigured delay time at the second apparatus to determine a latency associated with the first signal transmitted by the first apparatus. A processor at each of the first and second apparatus can take a limited number of samples per second. As a result, the processor may be late in detecting a received signal. To accurately determine a distance between the first and second apparatus, the latency in receiving the first signal by the second apparatus and the latency in receiving the second signal by the first apparatus should be known or calculated. Example equations that can be used to determine the latency are described further below.

The order of the steps may be different than the order shown in FIG. 1. For example, the latency associated with the first signal may be determined before the second signal is transmitted.

At 216, the first apparatus determines a distance between the first and second apparatus based, at least in part, on the determined latencies. As described further below, the distance may be calculated via a time-of-flight measurement obtained by timing the travel of an acoustic signal from the first apparatus to the second apparatus. Example equations that can be used to determine the distance are described further below.

Optionally, after 216, the first apparatus determines a direction or orientation of the second apparatus relative to the first apparatus. As described in more detail with reference to FIG. 4, to determine the orientation of the second apparatus relative to the first apparatus, the first apparatus may use multiple receivers/microphones to receive the second signal. According to one example, the first apparatus has at least three receivers/microphones. The first apparatus determines the direction or orientation of the second apparatus based on a distance between each of the receivers. Example equations that can be used to determine the direction or orientation are described further below.

According to the example illustrated in FIG. 2, the first apparatus and the second apparatus perform the processing to determine the distance between the first apparatus and the second apparatus and a location of the second apparatus relative to the first apparatus. However, any one of the first apparatus, second apparatus, another device, or a combination of devices within the network may be used to perform this processing. According to an example, the information gathered by the first apparatus and the second apparatus may be transmitted to a separate mobile device or a cloud for processing.

Figure 3:
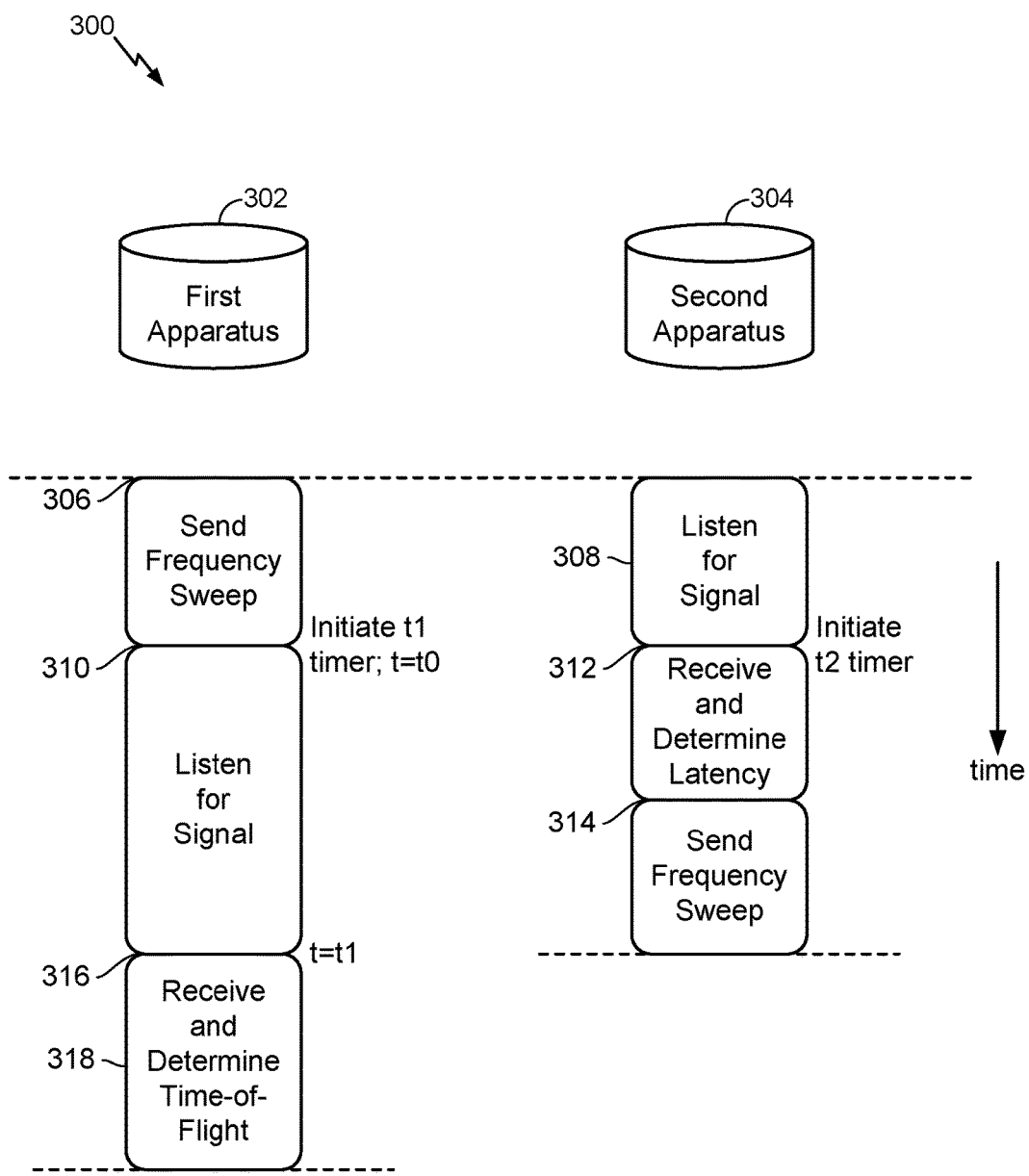
FIG. 3 illustrates an example call-flow diagram for determining a distance between a first and second apparatus.

FIG. 3 illustrates an example call-flow diagram 300 for determining a distance between a first and second apparatus, in accordance with aspects of the present disclosure. The first apparatus 302 and the second apparatus 304 include one or more components illustrated in FIG. 1.

At 306, the first apparatus 302 transmits a frequency sweep, or a sound wave having a frequency varying in time. According to an example, the frequency sweep is a 4 kHz to 8 kHz sweep that is transmitted as a step function. In some examples, the frequency is increased 150 Hz every 1 millisecond. At 308, the second apparatus 304 is listening for the signal transmitted by the first apparatus 302. According to an example, the second apparatus is running a Fast Hartley Transform and polling for a spike in the amplitude of the incoming frequencies from the first apparatus 302. By running a Fast Hartley Transform, the second apparatus can identify modulations in frequency amplitudes. However, other algorithms for converting time signals to the frequency domain may be used, including a Fast Fourier Transform.

At 310, the first apparatus 302 completes transmitting the frequency sweep, and initiates a first timer ("t1 timer"). Additionally, at 310, the first apparatus begins listening for a response signal from the second apparatus 304. According to an example, the first apparatus is running a Fast Hartley Transform and polling for a spike in the amplitude of incoming frequencies from the second apparatus 304.

The signal transmitted between 306 and 310 by the first apparatus travels to the second apparatus. Beginning at 312, the signal is detected by the second apparatus 304. The second apparatus 304 calculates a latency associated with receiving the signal from the first apparatus 302. Example equations that can be used to determine the latency are described further below. The second apparatus 304 sets a timer ("t2 timer") for a preconfigured amount of time less the determined latency associated with receiving first signal from the first apparatus.

The preconfigured time is a time delay used for synchronization. The preconfigured time delay ensures that the first apparatus will have completed transmitting and will be listening to receive a transmission from the second apparatus. Furthermore, the preconfigured time based on the t2 timer ensures that the second apparatus 304 will transmit its frequency sweep after the preconfigured amount of time, regardless of the latency in the received signal from the first apparatus 302.

According to an example, the preconfigured amount of time is 200 millisecond (ms). Thus, the second apparatus sets the t2 timer for 200 ms less the determined latency associated with receiving the signal from the first apparatus. In this manner, the second apparatus responds 200 ms (minus the determined latency) after receiving the frequency sweep from the first apparatus.

Upon expiry of the t2 timer, at 314, the second apparatus 304 responds to the first apparatus with a frequency sweep having a different frequency range than the frequency transmitted by the first apparatus (at 306). According to an example, the second apparatus responds with a 10 kHz to 14 kHz frequency sweep that is transmitted as a step function. In some examples, the frequency is increased 150 Hz every 1 millisecond.

The signal transmitted by the second apparatus 304 travels to and is detected by the first apparatus 302 (which was listening for the signal as described above). At time $t=t_1$, shown at 316, upon detecting the signal, the first apparatus 302 stops the t1 timer and calculates the latency in receiving the signal from the second apparatus. Example equations that can be used to determine the latency are described further below.

At 318, the first apparatus calculates the time of flight (ToF) associated with the first signal transmitted from the first apparatus to the second apparatus (transmitted beginning 306) or the second signal transmitted from the second apparatus to the first apparatus (transmitted beginning 314). The ToF is assumed to be identical for a signal traveling from the first apparatus to the second apparatus and from the second apparatus to the first apparatus. As described above, the first apparatus, the second apparatus, or any other device in the network may perform the calculations and processing described herein, include calculating the ToF.

Assuming $t_0$ represents the start time of the t1 timer and $t_1$ represents the stop time of the t1 timer:

$$ToF = \frac{(t1 - K) - t0 - L}{2}$$

K represents the latency in receiving the signal transmitted by the second apparatus, and L represents the preconfigured time delay at the second apparatus (for example, 200 ms). The distance between the first and second apparatus is determined by multiplying the ToF by the speed of sound, c, as shown below:

$$\text{Distance} = ToF \times c$$

As described above, each of the first and second apparatus transmit a frequency sweep having a different range of frequencies. Using different ranges of frequencies ensures that echoes of the transmitted signal from walls or other objects do not alter the reception of the transmitted signal. According to an aspect, at least one of the first signal transmitted by the first apparatus or the second signal transmitted by the second apparatus comprises ultrasonic signals. According to one example, one or more of the signals may have a frequency greater than or equal to 20 kHz. According to another example, the signals may have a frequency greater than or equal to 8 kHz. According to yet another example, as described with reference to FIG. 3, the signals may have a frequency greater than or equal to 4 kHz.

Transmitting a frequency sweep helps in determining a latency of a signal. If the second apparatus receives a frequency sweep, the exact frequency of the detected signal will vary based on when sampling occurs by the receiving apparatus. Assuming the rate of change of the signal's frequency is constant and known, the latency, or the delay in time of arrival of the signal at the apparatus, is determined based on the measured frequency of the received signal. In some examples, the rate of change of the frequency sweep may be 150 Hz per 1 millisecond, as described above. For example:

$$\text{Latency} = \frac{\text{measured frequency} - \text{incident frequency of sweep}}{\text{rate of change of frequency sweep}}$$

Both of the first and second apparatuses may calculate a respective latency associated with receiving a respective signal at the apparatus. As described above, the second apparatus subtracts the determined latency from the preconfigured timer. The latency is used to calculate the ToF, which in turn is used to determine a distance between the first and second apparatus.

After determining a distance between the first and second apparatus, according to aspects, the first apparatus determines a direction of the second apparatus relative to the first apparatus.

Figure 4:
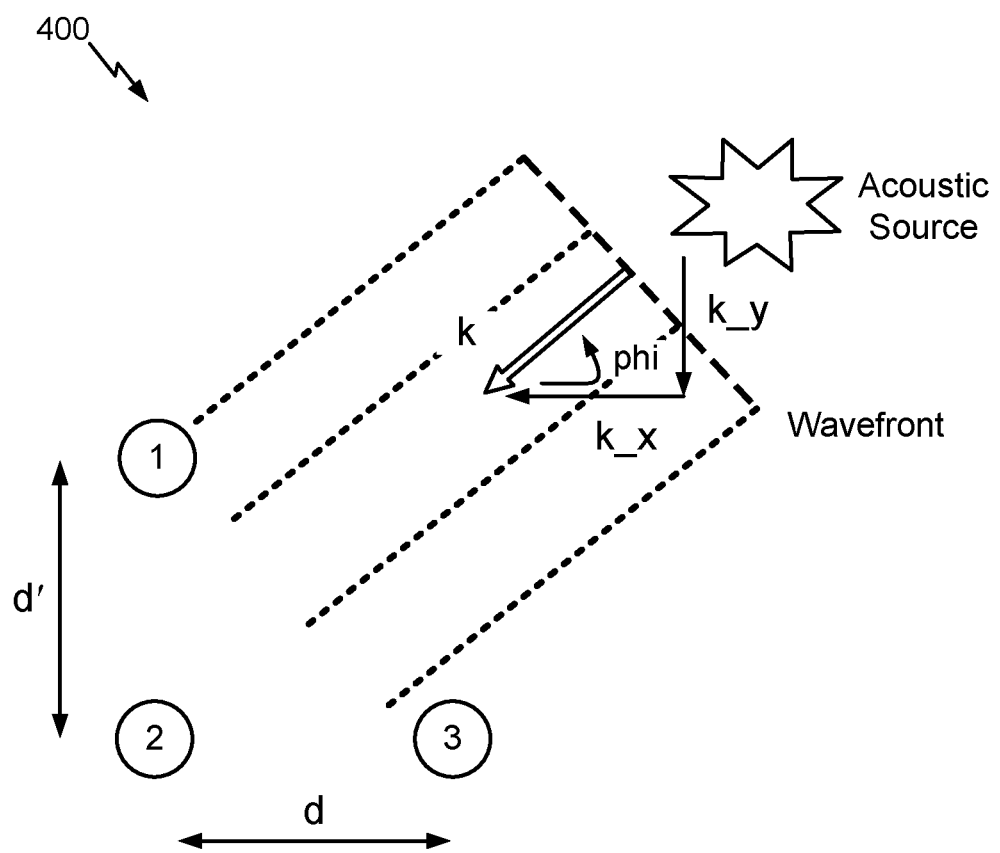
FIG. 4 illustrates an example of determining a direction of a second apparatus relative to a first apparatus.

FIG. 4 illustrates an example 400 for determining direction of the second apparatus relative to the first apparatus. According to aspects, the first apparatus has more than one receiver/microphone. For illustrative purposes, the first apparatus has a three microphone array including microphone 1, microphone 2, and microphone 3. The distance between microphones 1 and 2 is d' and the distance between microphone 2 and 3 is d. An acoustic source, such as the second apparatus, transmits a signal to the first apparatus. According to an aspect, the signal comprises the second signal having a second frequency as shown at 204 in FIG. 2.

The signal travels with a speed and direction given by the vector k. The magnitude of the vector k is $$\frac{\omega}{c},$$

where ω represents me angular velocity and c represents the phase velocity. The direction of the vector k is normal to the wavefront.

The difference in time of reception of the signal between microphones 1 and 2 is represented as T12 and the difference in time of reception of the signal between microphones 2 and 3 is T23.

The horizontal component of the phase velocity c of the signal received by the first apparatus is:

$$c\_x = \frac{d}{T23}$$

The vertical component of the phase velocity c of the signal received by the first apparatus is:

$$c\_y = \frac{d'}{T12}$$

The delay in receiving a same signal between microphones 1 and 2 and microphones 2 and 3 is dependent on the vertical and horizontal component of the vector k, respectively. As illustrated in FIG. 4, k_x represents the horizontal component of the vector k and k_y represents the vertical component of the vector k.

$$k\_x = k \cos(phi)$$

$$k\_y = k \sin(phi)$$

Substituting for k and solving for phi yields the direction of the second apparatus relative to the first apparatus. According to FIG. 4, $$phi = \arctan\frac{c\_x}{c\_y}$$

Thus, aspects described herein are used to determine a distance and direction of the second device relative to the first device. The techniques for determining a distance and direction between the first and second apparatus are useful to configure audio devices, and particularly useful in the context of speakers. By determining the distance and direction between first and second speakers, a home theater system can be configured. Based on the direction of one speaker relative to another, each of the speakers can be configured based on a respective location with minimal user interaction. As an example, a first speaker is configured as a front-left speaker and the other speaker is configured as a rear-right speaker based on a physical location in a room. According to another example, two Bluetooth speakers which form a stereo may automatically determine which speaker is on a left channel and which speaker is on a right channel.

According to one example, at least some of the signaling between the first and second apparatus is ultrasonic. According to another example, the signaling is generally outside the range of human hearing. Accordingly, the aspects described herein are useful for configuring speakers or other wireless devices in a home theater system in a user-friendly, non-disruptive manner.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

The invention claimed is:

1. A first apparatus, comprising:
a transmitter configured to transmit a first signal having a first frequency to a second apparatus;
a first receiver configured to receive, from the second apparatus, a second signal having a second frequency responsive to the first signal; and
a processor configured to:
determine a latency associated with the transmitted first signal and received second signal; and
determine a distance between the first apparatus and the second apparatus based, at least in part, on the determined latencies.

2. The first apparatus of claim 1, wherein determining the distance comprises:
determining a total travel time of the first signal and the second signal based, at least in part, on the determined latencies.

3. The first apparatus of claim 2, further comprising:
a timer,
wherein the processor is further configured to:
start the timer after transmitting the first signal;
stop the timer after receiving the second signal; and
determine the total travel time based, at least in part, on an elapsed time between starting and stopping of the timer.

4. The first apparatus of claim 3, wherein the processor is configured to:
determine a time of flight by subtracting the determined latencies from the total travel time and dividing the difference by two.

5. The first apparatus of claim 4, wherein the distance is determined based, at least in part, on the speed of sound and the determined time of flight.

6. The first apparatus of claim 4, wherein the latency associated with the transmitted first signal comprises a preconfigured delay time at the second apparatus.

7. The first apparatus of claim 1, wherein receiving the second signal comprises:
receiving a sound wave with a frequency varying in time.

8. The first apparatus of claim 7, wherein the latency associated with the received second signal at the first apparatus is determined based, at least in part, on a rate of change of frequency of the second signal.

9. The first apparatus of claim 1, further comprising:
a second receiver configured to receive the second signal; and
a third receiver configured to receive the second signal,
wherein the processor is configured to determine a direction of the second apparatus relative to the first apparatus based, at least in part, on a difference in arrival times of the second signal at each of the first, second, and third receivers.

10. The first apparatus of claim 9, wherein determining the direction is further based on a distance between the first and second receivers and a distance between the second and third receivers.

11. The first apparatus of claim 1, wherein at least one of the first signal or the second signal comprises an ultrasonic signal.

12. The first apparatus of claim 1, wherein at least one of the first frequency or the second frequency comprises a frequency greater than or equal to 8 kHz.

13. A second apparatus, comprising a processor and memory comprising instructions which, when executed by the processor, cause the second apparatus to:
receive, from a first apparatus, a first signal having a first frequency;
determine a latency associated with receiving the first signal;
calculate when to transmit a second signal having a second frequency based on the determined latency; and
transmit the second signal based on the calculation.

14. The second apparatus of claim 13, wherein:
the first signal comprises a signal with a frequency varying in time.

15. The second apparatus of claim 13, wherein determining the latency comprises:
determining a delay in time of an arrival of the first signal at the second apparatus based, at least in part, on a rate of change of frequency of the first signal.

16. The second apparatus of claim 13, wherein calculating when to transmit the second signal comprises:
subtracting the determined latency from a preconfigured delay time.

17. The second apparatus of claim 13, wherein at least one of the first frequency or the second frequency comprises a frequency greater than or equal to 8 kHz.

18. A method for communication by a first apparatus, comprising:
transmitting a first signal to a second apparatus;
receiving a second signal from the second apparatus, responsive to the first signal, at each of a first, second, and third microphones at the first apparatus; and
determining a distance between the first and second apparatus based, at least in part, on a latency associated with the first, transmitted signal and a latency associated with the second, received signal.

19. The method of claim 18, further comprising:
determining a time of flight for the second signal to reach each of the first, second, and third microphones; and determining a direction of the second apparatus relative to the first apparatus based, at least in part, on: a distance between the first and second microphone, a distance between the second and third microphone, and the determined time of flights.

20. The method of claim 18, wherein the latency associated with the second, received signal at the first apparatus is determined based, at least in part, on a rate of change of frequency of the second signal.

\* \* \* \* \*